March 2, 1943.  J. MERCIER  2,312,432
CONTROL OF TWO OR MORE CONCOMITANT DEVICES
Filed April 23, 1938

INVENTOR.
JEAN MERCIER
BY Watson Cole, Grindle
  & Watson
ATTORNEYS

Patented Mar. 2, 1943

2,312,432

UNITED STATES PATENT OFFICE 2,312,432

CONTROL OF TWO OR MORE CONCOMITANT DEVICES

Jean Mercier, Neuilly-sur-Seine, France; vested in the Alien Property Custodian

Application April 23, 1938, Serial No. 203,849
In Great Britain May 13, 1937

5 Claims. (Cl. 244—85)

My invention relates to machines, and particularly to vehicles or airplanes, in which two or more fluid-actuated devices are to be controlled by a central distributing unit. Such devices may be wing flaps, brakes or the like, which are frequently installed in symmetrical positions and generally intended to be operated simultaneously and in the same direction.

Normally in the operation of such devices, if the uniform motion is disturbed, the operation of the whole machine is affected. For example, a land vehicle will leave its course of travel when the brakes are unevenly applied, or an air-supported vehicle will lose its state of balance when its wing flaps are operated in out of phase relationship. This reaction of the machine to a disturbance in the uniformity of the fluid-actuated devices will call for the intervention of the operator, who will move the general controls of the machine so as to restore the same to its desired course or balance.

It has already been proposed to control fluid-actuated devices, such as jacks lifting a presshead, by controlling the amount of fluid to be admitted to or exhausted from each jack to insure an automatic uniform movement of the jacks.

The present invention is not concerned with a control of fluid-actuated devices whose function is to produce automatic uniform motion, but has for its object to provide control means for regulating the fluid supplied to and exhausted from hydraulic devices mounted in the machine, by means of the general controls of that machine.

The general arrangement suggested by the present invention permits a simpler and lighter structure than has heretofore been necessary with a full automatic control which normally requires supplementary mechanical or hydraulic connections between the hydraulic devices and the member controlling the distribution of the fluid.

It is an object of the present invention to control the distribution of fluid to the hydraulic devices so that the latter will be moved either simultaneously and uniformly or differentially in accordance with the movement of the general controls executed by the operator of the machine.

To that end, a master valve and a distributor valve are provided. The master valve is independently controlled by the operator and in one position connects the distributor valve with a supply of fluid under pressure, while in another position connecting the distributor valve with an exhaust line.

The distributor valve controls the amount of fluid admitted to or discharged from each individual hydraulic device.

In a preferred form the distributor valve has the structure of a slide valve including a movable valve element which is operatively connected to the general controls of the machine. By means of the said distributor valve, all hydraulic devices in direct communication with the master valve are so connected that fluid can be supplied to the same, or may be discharged therefrom according to the operation of the master valve.

When the master valve is operated, if the hydraulic devices are actuated and fail to move with the desired uniformity, then an unbalanced reaction of the machine would occur and the operator would be compelled to move the general controls to correct same. This movement of the general controls will displace the movable element of the distributor valve, which will in turn produce a change in the fluid supplied or exhausted from the hydraulic devices, tending to restore their uniform motion.

One important advantage of the combination according to the present invention is, when the general controls of the machine are displaced, the corresponding displacement of the movable element of the distributor valve will cause the hydraulic devices to be operated, thus facilitating the result desired by the operator. Thus, for instance, if the master valve is actuated in order to apply the brakes of a vehicle, if the brakes are applied unevenly, the vehicle would veer to one side. To correct this condition, the operator would then actuate the general controls. This would produce a movement of the control valve which will in turn affect the supply of fluid to each individual brake, thus assisting in the correction desired by the operator. On the other hand, if the brakes, when applied by actuating the master valve, do work with the required uniformity, but the operator at the same time should actuate the general controls of the machine so as to change its course, then again the corresponding movement of the distributor valve will modify the supply of fluid to the individual brakes so as to assist in obtaining the desired change of course.

Further features of the present invention may be apparent from the following description of one embodiment thereof taken in connection with the accompanying drawing, wherein identical reference numerals are applied to identical parts in the several figures, and in which.

Figure 1:
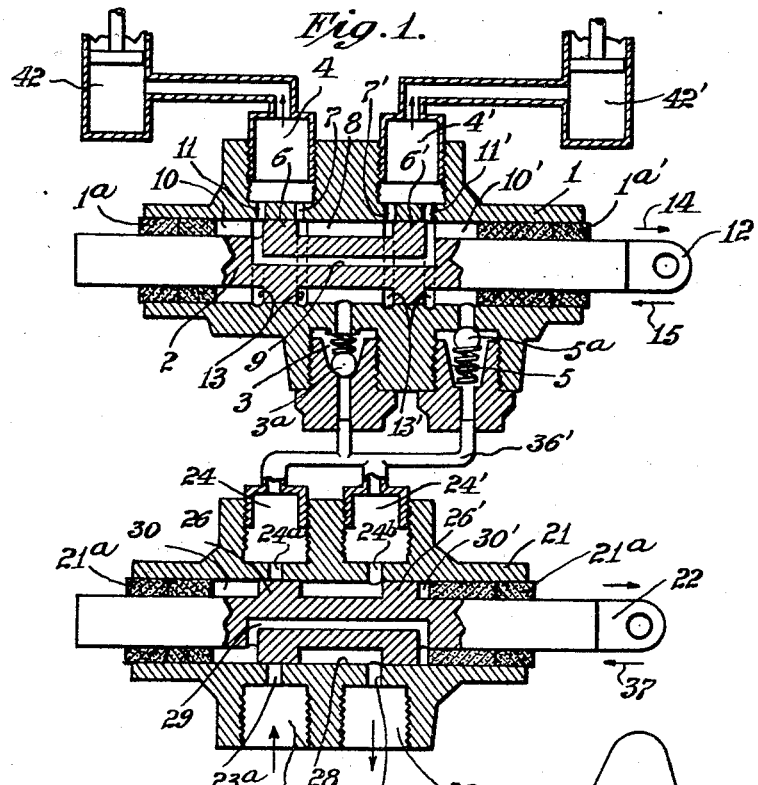
Figure 1 is a longitudinal axial section of a distributor and a master valve.

The distributor valve shown in Figure 1 comprises a casing 1 having a cylinder bore extending throughout its axial length. A movable valve element 2 is disposed inside said cylinder bore sealed at both ends by packing members 1—a. An inlet port 3 and a discharge port 5 are on one side of casing 1, both communicating through orifices with said cylinder bore. Check valves 3—a and 5—a which may be provided in ports 3 and 5 respectively, prevent any outflow of fluid through the inlet port and any inflow of fluid through the discharge port. In the portion of casing 1 opposite to ports 3 and 5 there are located two distributor ports 4 and 4' each communicating through two separate orifices 7, 11 and 7', 11' respectively with said cylinder bore inside casing 1. Movable valve element 2 includes two projecting piston-like portions 6 and 6' which slidably engage the wall of said cylinder bore. Portions 6 and 6' together with the remaining portion of element 2 and the walls of said cylinder bore define annular chambers 10, 8 and 10' in said cylinder bore. Passage 9 traversing the interior of element 2 affords communication between the two external chambers 10 and 10'. As shown at 13 and 13' slight annular recesses may be provided in the wall of said cylinder bore along the edges of portions 6 and 6'.

Distributor ports 4 and 4' are connected to hydraulic devices diagrammatically shown at 42 and 42' respectively.

The operation of the valve is as follows:

The distributor valve is shown in its neutral position. In that position, both distributing ports 4 and 4' are in full and equal communication with inlet port 3 and discharge port 5. Accordingly, the operation of devices 42 and 42' will be directly controlled by the master valve which will either connect inlet port 3 to a source of fluid under pressure or discharge port 5 to an exhaust line. Whenever movable valve element 2 which is operatively connected at 12 to the general controls of a machine, is displaced in the direction of arrow 14, orifices 7 will be obstructed whereby port 4 is cut off chamber 8 and consequently port 3. However, port 4 remains in communication with port 5 through orifices 11, chamber 10, passage 9 and chamber 10'. The condition of port 4' changes in a reverse manner because orifices 11' is obstructed whereby port 4' is disconnected from port 5 while it remains in full communication with port 3 through orifice 7' and chamber 8.

Displacement of movable element 2 in the direction of arrow 15 affects the condition of ports 4 and 4' in the opposite manner, i. e., port 4' is cut off from the inlet port while remaining in communication with the discharge port, whereas port 4 is cut off from the discharge port while remaining in communication with the inlet port.

By virtue of passage 9 and annular recesses 13, fluid pressure acting on element 2 is evenly distributed in the axial and radial direction. Element 2 is thereby balanced in all directions and can be displaced without appreciable effort even when distributing fluid under very high pressure.

Figure 2:
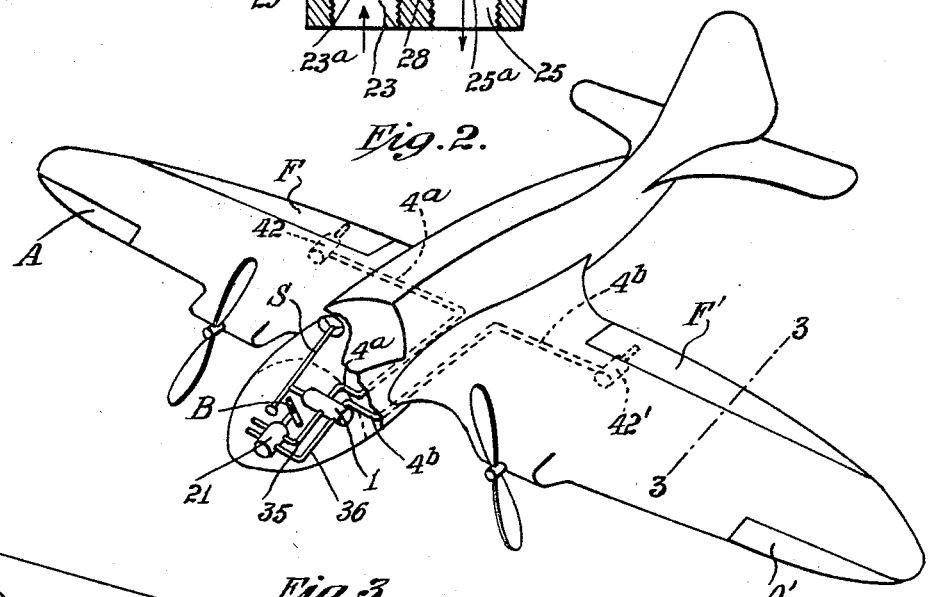
Figure 2 is a view of an airplane showing diagrammatically the various connections between the wing flaps, the master valve, the distributor valve and the control stick in one embodiment of the invention.

As shown diagrammatically in Figure 1, ports 3 and 5 of the distributor valve are connected to the distributing ports of the master valve. This communication may be established through two separate conduits 35 and 36 (as shown in Figure 2), in which case check valves 3—a and 5—a may be omitted in the distributor valve. Alternatively, the two inlet and discharge ports of the distributor valve may be connected by one common conduit 36' to the two distributor ports of the master valve (as shown in Figure 1) in which case the two check valves are required.

The master valve shown in the lower portion of Figure 1 comprises a casing 21, in which a cylinder bore is provided and extends throughout the axial length of casing 21. Inside this cylinder bore is located a slidable valve element 22, sealed at either end against leakage of fluid by suitable packing devices 21—a. Inlet port 23 in casing 21, intended to be connected to a source of fluid under pressure, communicates with the interior of said cylinder bore through orifice 23—a; discharge port 25 in casing 21, intended to be connected to an exhaust line communicates with the same through orifice 25—a. On the opposite side of casing 21 are provided two distributor ports 24 and 24' communicating with said cylinder bore through orifices 24—a and 24—b respectively. Movable valve element 22 is provided with two projecting piston-like portions 26 and 26', which slidably engage the wall of said cylinder bore and define, together with the said wall and the other portions of element 22, three annular chambers 30, 30' and 28. A passage 29, extending through the interior of element 22, affords communication between the two external chambers 30 and 30'.

In Figure 1 the master valve is shown in the discharge position. In this position fluid will be exhausted from the hydraulic devices 42 and 42' through the distributor valve, conduit 36', port 24' and through the master valve discharging from port 25. If the master valve is displaced in the direction of arrow 37, it will first reach a position in which all four ports are obstructed. In this position, fluid can be neither supplied to nor exhausted from the hydraulic devices. A further displacement of element 22 in the direction of arrow 37 will result in opening communication between ports 23 and 24, thus supplying fluid under pressure to the hydraulic devices while closing the exhaust fluid flow by cutting off the communication between ports 25 and 24'.

Passage 29 causes pressure in the external chambers 30 and 30' to be balanced, whereby the force necessary to displace element 22 is reduced.

Figure 2 is a diagrammatic illustration of the various connections necessary in one embodiment of the present invention as applied to the control of the wing flaps of an airplane. The distributor valve 1 and the master valve 21 are so connected that a foot pedal B connected to the valve 21 is provided to actuate element 22 of the master valve, and thus provide the in or outflow of fluid to the hydraulic devices. Pipes 4—a and 4—b connect a pair of jacks 42 and 42' with the ports 4 and 4' of the distributor valve which in turn controls the position of wing flaps F and F'. The movable valve element 2 of distributor valve 1 is operatively connected to the control stick S, by which the pilot also controls the position of a pair of ailerons A and A'.

For a clear understanding of the present invention, it will be useful to consider two examples of the possible disturbances that may occur:

(1) It will be assumed that the pair of hydraulic devices 42 and 42' control the position of wing flaps F and F'. It will be further assumed that the master valve has been actuated so as to open the supply line. Fluid under pressure will be supplied accordingly to 42 and 42'. In the event there is some defect in one of the hydraulic devices 42 or 42' causing it to protract slower than the other one, wing flap F' will be raised differently from F,—as a result the airflow will unbalance the airplane and the pilot will be compelled to actuate the control stick to re-adjust the ailerons to restore the required balance. It will be assumed that the required movement of stick S will displace element 2 in the direction of arrow 15. As a result, device 42 will continue to be supplied with fluid under pressure while 42' is shut off. Consequently, wing flap F' will be stopped while F will continue to rise. As soon as the required balance has been recovered—and this point will be practically reached at the time when wing flap F has come into the same position as wing flap F'—the pilot will return stick S to its neutral position and both hydraulic devices will then continue to be evenly supplied.

(2) In the opposite case, in which the wing flaps are lowered fluid is discharged from devices 42 and 42'. Again it will be assumed there is some defect in one of the hydraulic devices causing wing flap F to move more slowly than wing flap F'. This again will cause the airflow to unbalance the airplane, but in a direction opposite to that of the first example. Consequently, the ailerons must be displaced in the opposite direction, to do this the pilot will move stick S in a direction displacing element 2 of the distributor valve in the direction of arrow 14. This displacement of element 2 leaves device 42 in communication with the exhaust, whereby wing flap F has a chance to catch up with wing flap F'.

It is obvious that the distributor valve affords a possibility of correcting the disturbance contemplated in the preceding two examples by reversing the position of the master valve. Thus, for instance, if it proves impossible in the first example to obtain further expansion of device 42', then reversing the position of the master valve so as to open the exhaust line will rapidly lower wing flap F without affecting the position of wing flap F'.

It is also apparent that, if the pilot operates stick S to change the position of ailerons A and A' while actuating the master valve 21 so as to raise or lower the wing flaps, the displacement of element 2 brought about by the movement of stick S will produce a difference in the supply or exhaust of fluid to or from devices 42 and 42' respectively and this difference will cause a difference in the position of wing flaps F and F' which will contribute to the result desired by the operation of the ailerons.

Figure 3:
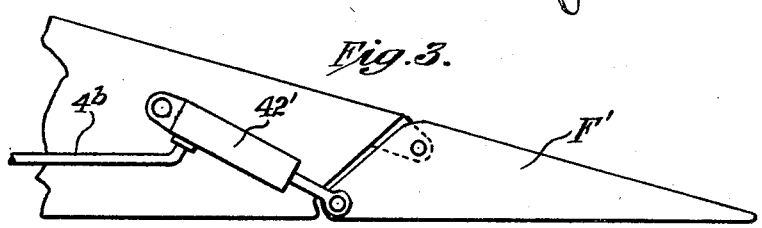
Figure 3 is a partial sectional view along line 3—3 of Figure 2.

Figure 3 shows diagrammatically the operation of wing flap F' by the hydraulic device 42'. The latter consists in a cylinder attached to the wing and a piston associated with the cylinder and attached to wing flap F'. Whenever fluid is supplied through pipe 4—b, the piston will be protracted and will raise the wing flap. Reversely, whenever pipe 4—b is connected through distributor valve 1 and master valve 21 to an exhaust line, fluid will be exhausted from cylinder 42' which allows the wing flap to return to its normal position.

For the sake of simplicity, the invention has been illustrated and described in connection with spring return hydraulic actuated devices. However, it could easily be adapted to be used in connection with two-way hydraulic actuated devices. This would require a few additional connections between the second port of each hydraulic device and the master valve or with the supply line of fluid under pressure. These additional connections can be easily devised by any one skilled in the art.

The foregoing description is not intended to limit the present invention, which extends to all changes, modifications and equivalents comprehended within the scope of the appended claims.

What is claimed is:

1. In a machine, the combination of two fluid actuated devices intended to be operated simultaneously and correspondingly, and capable, when operated in a different manner, of producing a disturbance in the working of said machine, control means independent of said devices and adapted to be actuated by the operator of the machine for correcting such disturbances, valve means for distributing fluid under pressure to said devices, said valve means comprising a valve body having inlet and outlet ports, means for alternatively connecting said ports to a supply and a discharge conduit, respectively, distributing ports in said valve body connected to said devices, respectively, and movable valve means inside said valve body normally affording communication between said distributing ports and said inlet and outlet ports and adapted, when displaced from neutral position, to restrict the communication between said inlet port and one of said distributing ports and simultaneously to restrict the communication between said outlet port and said other distributing port, and means for controlling said movable valve means from the outside, said means for controlling said movable valve means being operatively connected with said control means for correcting the disturbances in the machine.

2. In a machine, the combination of two fluid actuated devices intended to be operated simultaneously and correspondingly, and capable, when operated in a different manner, of producing a disturbance in the working of said machine, control means independent of said devices and adapted to be actuated by the operator of the machine for correcting such disturbances, valve means for distributing fluid under pressure to said devices, said valve means comprising a valve body having inlet and outlet ports, means for alternatively connecting said ports to a supply and a discharge conduit, respectively, distributing ports in said valve body connected to said fluid actuated devices, respectively, a movable valve member inside said valve body normally affording communication between said distributing ports and said inlet and outlet ports and adapted when displaced from its neutral position to restrict the communication between said inlet port and one of said distributing ports and simultaneously to restrict the communication between said outlet port and said other distributing port, and means for controlling said movable member from the outside, said means for controlling said movable member being operatively connected with said control means for correcting the disturbances in the machine.

3. In a machine, the combination of two fluid actuated devices intended to be operated simultaneously and correspondingly, and capable, when operated in a different manner, of producing a disturbance in the working of said machine, control means independent of said devices and adapted to be actuated by the operator of the machine for correcting such disturbances, valve means for distributing fluid under pressure to said devices, said valve means comprising a valve body having inlet and outlet ports, check valves in said ports to prevent an outflow of liquid through the inlet and an inflow of liquid through the outlet port, a supply and discharge conduit connected to both ports, means for alternatively connecting said conduit to a source of fluid under pressure and to the exhaust, distributing ports in said valve body connected to said fluid actuated devices, respectively, and further valve means inside said valve body normally affording communication between said distributing ports and said inlet and outlet ports and adapted when displaced from its neutral position to restrict the communication between said inlet port and one of said distributing ports and simultaneously to restrict the communication between said outlet port and said other distributing port, and means for controlling said further valve means from the outside, said means for controlling said further valve means being operatively connected with said control means for correcting the disturbances in the machine.

4. A machine according to claim 2, said valve body having a cylinder bore and said movable valve member having at least two piston-like portions slidably engaging the wall of said bore, said portions being disposed between at least three annular recesses of said movable member so as to form annular chambers between said movable member and said valve body.

5. A machine according to claim 2, said valve body having a cylinder bore, each of said distributing ports communicating with said bore through two orifices, and said movable valve member having at least two piston-like portions slidably engaging the wall of said bore, said piston-like portions being disposed between at least three annular recesses of said movable member so as to form at least one central and two external annular chambers between said movable member and said valve body, a passage affording communication between said two external chambers and parallel annular recesses in the wall of said cylinder bore extending circularly from and communicating with each of said orifices.

JEAN MERCIER.